(12) United States Patent
Cryan et al.

(10) Patent No.: US 6,487,351 B1
(45) Date of Patent: Nov. 26, 2002

(54) FIBER OPTIC FACEPLATE

(75) Inventors: Colm Cryan, Arlington; Richard Strack, Sturbridge, both of MA (US)

(73) Assignee: Schott Fiber Optics, Southbridge, MA (US)

(*) Notice: Subject to any disclaimer, the term of this patent is extended or adjusted under 35 U.S.C. 154(b) by 2 days.

(21) Appl. No.: 09/707,046

(22) Filed: Nov. 6, 2000

(51) Int. Cl.[7] .................................................. G02B 6/04
(52) U.S. Cl. ...................................................... 385/120
(58) Field of Search .............................. 385/120, 115, 385/116, 126, 119–121, 30, 24, 39, 385, 54, 46, 82

(56) References Cited

U.S. PATENT DOCUMENTS

| | | | |
|---|---|---|---|
| 5,388,174 A | * | 2/1995 | Roll et al. .................... 385/80 |
| 5,394,498 A | | 2/1995 | Hinterlong et al. |
| 5,446,815 A | * | 8/1995 | Ota et al. ...................... 385/33 |
| 5,519,801 A | | 5/1996 | Le Noane et al. |
| 5,553,184 A | * | 9/1996 | Eikelmann et al. .......... 385/115 |
| 5,715,345 A | * | 2/1998 | McKinley .................... 385/115 |
| 5,790,727 A | | 8/1998 | Dhadwal et al. |
| 5,848,214 A | | 12/1998 | Haas et al. |
| 5,881,195 A | | 3/1999 | Walker |
| 5,907,650 A | * | 5/1999 | Sherman et al. ............... 385/80 |
| 5,940,566 A | | 8/1999 | Seng |
| 6,041,154 A1 | * | 3/2001 | Ono et al. .................... 385/115 |
| 6,243,520 B1 | * | 6/2001 | Godman ...................... 385/115 |

* cited by examiner

Primary Examiner—Brian Sircus
Assistant Examiner—J. F. Duverne
(74) Attorney, Agent, or Firm—Volpe and Koenig, P.C.

(57) ABSTRACT

A fiber optic faceplate for coupling with optical sources or detectors. The optical sources or detectors are arranged in a two-dimensional array. Each of the sources or detectors has a pixel area precisely located at a predetermined coordinate. The faceplate includes a plurality of drawn and fused optic fibers. Each of the optic fibers is positioned at a corresponding position to the pixel areas of the optical sources or detectors. Interstitial fillers are located at each interstitial space between optic fibers and have an outside diameter corresponding to the space between the optic fibers to maintain the optic fibers in an aligned position as they are drawn.

13 Claims, 2 Drawing Sheets

FIBER OPTIC FACEPLATE

BACKGROUND

The present invention is directed to a fiber optic or wave guide faceplate for transmission of a light signal from or to a source or detector. More particularly, the present invention provides a faceplate for use with an array of sources or detectors in which the optical fibers or wave guides are precisely aligned with the sources or detectors.

Fiber optic faceplates are known in the field of imaging applications. In these prior known faceplates, it was desirable that the fibers be as small as possible to improve resolution of the sample image. In the past, faceplates have been fabricated with fiber sizes as small as three microns. Typically, these faceplates utilized an over-sampled approach in which as large a number as possible of these small fibers were utilized within the area of an optical source or detector in order to transmit a light signal. An example of a faceplate having an over-sampled approach is shown in FIG. 1, where the optical fibers 7 are closely packed. The interface with the pixels 8 of the optic sources or detectors is a random alignment. The actual active optical fibers are designated as 7' and shown with an unshaded center.

This over-sampled approach allows for ease of alignment of the array to the source or detector. However, this approach has inherent drawbacks as additional source and detector pixels are added. It has been recently proposed to move to two-dimensional arrays of sources and detectors having over four hundred elements. In such applications, there is an increase in the desire to save power and thus reduce the amount of heat generated. With the over-sampled approach, over 30% percent of the light is lost to the cladding surrounding each fiber. In addition, it is desirable to provide faceplates having optical fibers which are compatible with the system optical fibers. This indicates a future need for faceplates having graded index (GRIN) fibers and single mode fibers. These structures are not possible with the known over-sampled approaches.

It would be desirable to provide a faceplate having precision-aligned fibers located in the position of the pixel areas of the sources or detectors which are being optically linked.

SUMMARY

Briefly stated, the present invention is directed to a fiber optic faceplate for coupling with optical sources or detectors. The optical sources or detectors are arranged in a two-dimensional array. Each of the sources or detectors has a pixel area precisely located at a predetermined x-y coordinate spaced at an equal distance from neighboring pixel areas. The faceplate includes a plurality of drawn and fused optic fibers and interstitial fillers. Each of the optic fibers is positioned at a corresponding position to the pixel areas of the optical sources or detectors. The optic fibers are drawn to an outside diameter corresponding to the spacing distance between the predetermined x-y coordinates. The interstitial fillers are located at each interstitial space between optic fibers and have an outside diameter corresponding to the space between the optic fibers to maintain the optic fibers in an aligned position as they are drawn.

In another aspect, the present invention provides a fiber optic faceplate for coupling with optical sources or detectors. The optical sources or detectors are arranged in a two-dimensional array, with each individual source or detector being precisely located at predetermined position spaced apart from neighboring sources or detectors. The faceplate includes a plurality of drawn and fused optic fiber bundles. Each optic fiber bundle includes a plurality of optic fibers and has a greater cross-sectional area than an area of a pixel of the source or detector. Each optic fiber bundle is located in a generally aligned position with a corresponding pixel of the source or detector such that the pixel is aligned with at least half of the active area of the corresponding bundle. A filling material is located between the adjacent fiber bundles to maintain the fiber bundle in position as they are drawn and fused.

In another aspect, the present invention provides a wave guide faceplate including a plurality of fused and drawn wave guides and interstitial fillers. Each of the wave guides is positioned at a corresponding position to the optical sources or detectors. The wave guides have an outside diameter corresponding to the spacing distance between predetermined x-y coordinates. The interstitial fillers are located at each interstitial space between neighboring wave guides and have an outside diameter corresponding to the space between the wave guides to maintain the wave guides in an aligned position as they are drawn.

BRIEF DESCRIPTION OF THE DRAWINGS

The foregoing summary, as well as the following detail description of the preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements shown.

DETAILED DESCRIPTION OF THE PREFERRED EMBODIMENTS

Figure 1:
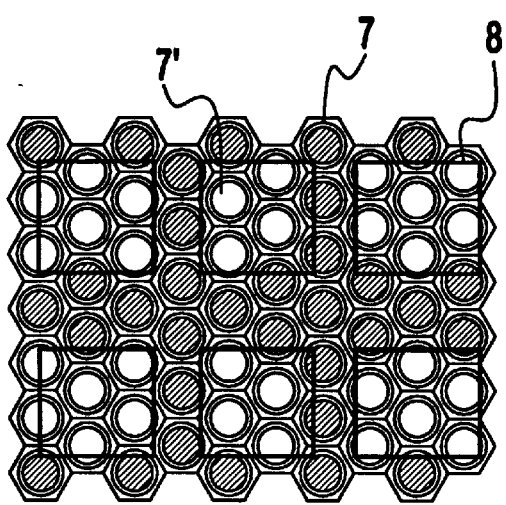
FIG. 1 is a greatly enlarged elevational view of a fiber optic faceplate in accordance with the known prior art.

Certain terminology is used in the following description for convenience only and is not considered limiting. The words "right", "left", "lower" and "upper" designate directions in the drawings to which references made. This terminology includes the words specifically noted above, derivatives thereof and words of similar import. Additionally, the terms "a" and "one" are defined as including one or more of the referenced item unless specifically noted.

Figure 2:
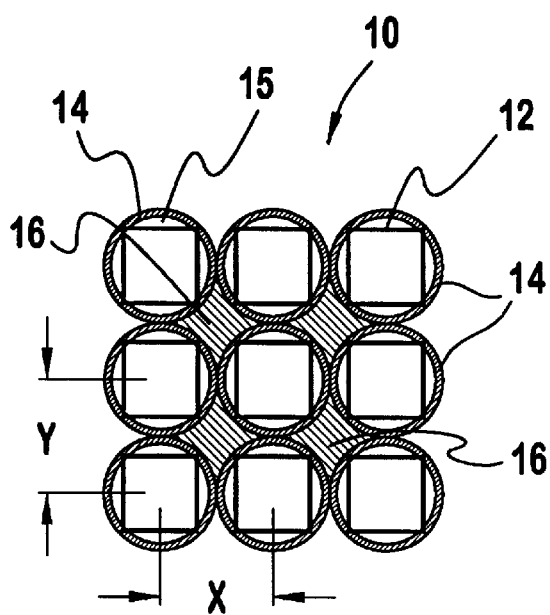
FIG. 2 is a greatly enlarged elevational view of a fiber optic faceplate in accordance with a first preferred embodiment of the present invention.

Referring now to FIG. 2, a fiber optic faceplate 10 for coupling with optical sources or detectors in accordance with first preferred embodiment of the invention is shown. The optical sources or detectors are arranged in a two-dimensional array. Each of the sources or detectors has a pixel area precisely located at a predetermined x-y coordinates typically spaced at an equal distance from neighboring pixel areas. The sources and detectors may be created as part of an IC using photolithographic methods, such that the x-y coordinates for each of the sources or detectors is precisely maintained within extremely precise tolerances (within a few microns or less). While the arrangement of the pixel area 12 of each source or detector is represented by a square in FIG. 2, those skilled in the art will recognize from the present disclosure that other shapes could be utilized, if desired.

The precision fiber array faceplate 10 is formed from a plurality of drawn and fused optic fibers 14 which are precisely positioned at a complementary position to the pixel area 12 of the optical sources or detectors. The optic fibers 14 are precision drawn to have a constant outside diameter. These precision optic fibers 14 are then stacked in a pre-form in positions which correspond to the pixel areas 12 of the sources or detectors and then drawn to an outside diameter that corresponds to the spacing distance between the predetermined x-y coordinates. Preferably, interstitial fillers 16 are located in each interstitial space between optic fibers 14. The interstitial fillers 16 have an outside diameter corresponding to the space between the optic fibers 14 to maintain the optic fibers in an aligned position as they are drawn. In the preferred embodiment, the viscosity of the glass used for the optic fibers 14 and the interstitial fillers 16 is matched at the drawing temperature and may for example be $10^8$ poises. The use of matching viscosities is believed to also provide for more uniform positioning of the fibers during drawing. The interstitial fillers 16 may have varying shapes to match the corresponding shape formed between adjacent optic fibers. Alternatively, the interstitial fillers 16 may be circular in cross-section and conform to the space between the optic fibers 12 during the drawing process. While positioning of optic fibers 12 can be obtained within 15 microns without the use of the interstitial fillers 16, through the use of interstitial fillers and fibers having a precisely controlled size, alignment can be improved by 20–40% or more.

In the first preferred embodiment of the faceplate 10 shown in FIG. 2, the core 15 of the optic fibers 14 is sized to match the pixel area 12 of the sources or detectors. This is achieved through a precisely controlled stacking and drawing process and greatly reduces the amount of heat generated and loss of energy to the cladding surrounding each fiber, as with the prior art over sampling technique shown in FIG. 1.

As shown in FIG. 2, preferably the optic fibers 14 are arranged in a square pack, with one interstitial filler 16 being located in the interstitial space between each group of four neighboring optic fibers 14.

Figure 3:
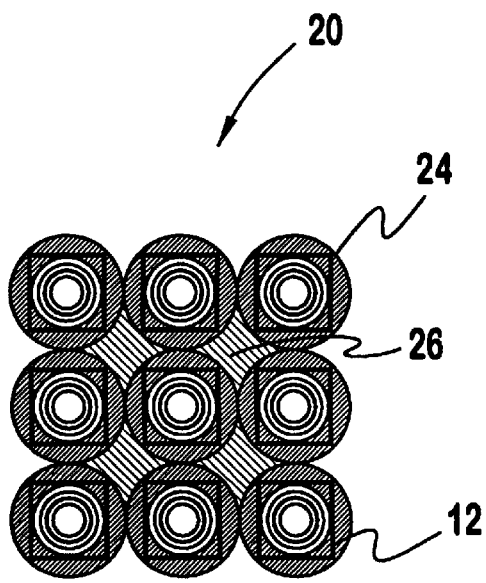
FIG. 3 is a greatly enlarged elevational view of a graded index fiber optic faceplate in accordance with a second preferred embodiment of the present invention.

Referring now to FIG. 3, a fiber optic faceplate 20 in accordance with a second preferred embodiment of the invention is shown. The fiber optic faceplate 20 utilizes graded index fibers 24 in the precision array. These fibers have a refractive index that decreases with distance from the center of the fiber. Preferably interstitial fillers 26 are located between fibers 24. Again, the pixel area 12 of the sources and detectors is shown and the graded index optic fibers 24 are precisely located at the x-y coordinates of the sources or detectors in order to perform a precision fiber optic faceplate. While the interstitial fillers 16, 26 may be of any material, it is also possible to utilize interstitial fillers 16, 26 made of a light absorbing material in order to reduce cross talk between adjacent optic fibers.

Figure 4:
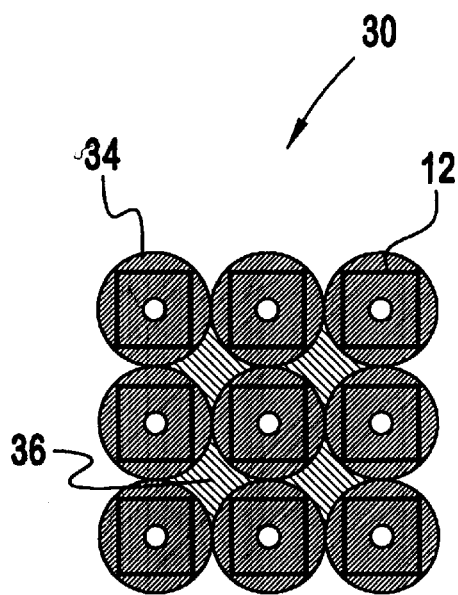
FIG. 4 is a greatly enlarged elevational view of a single mode fiber optic faceplate in accordance with a third preferred embodiment of the present invention.

Referring now to FIG. 4, a third embodiment of a fiber optic faceplate 30 is shown. The fiber optic faceplate 30 has a single mode fiber array in which a single mode fiber 34 is precisely located the x-y location of the center of each pixel 12. Interstitial fillers 36 are located between the single mode fibers 34. Again, the viscosity of the single mode fibers 34 and the interstitial fillers 36 is matched at the drawing temperature. The interstitial fillers 36 may be of any desired shape, but preferably are initially formed by round rods in the preform to precisely locate the optic fibers 34 in position.

Figure 5:
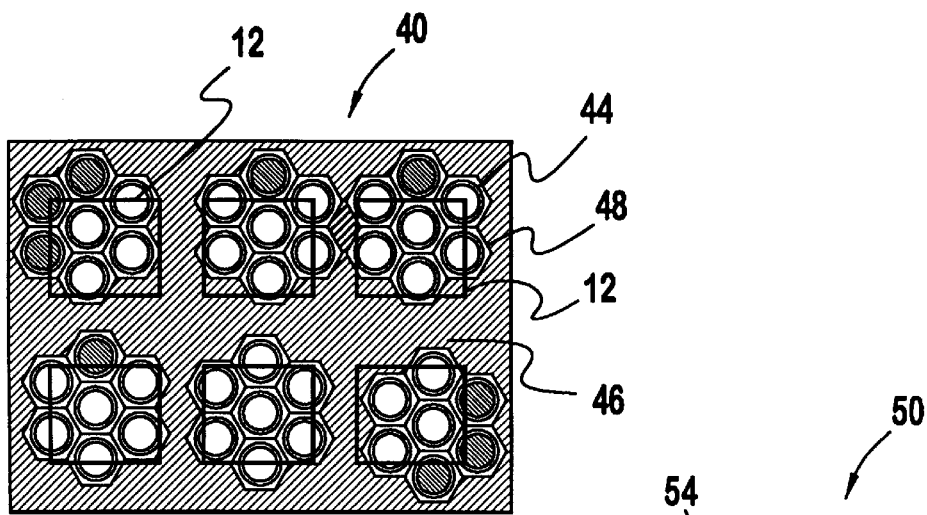
FIG. 5 is a greatly enlarged elevational view of a faceplate in accordance with a fourth preferred embodiment of the present invention.

Referring now to FIG. 5, a fourth preferred embodiment of a fiber optic faceplate 40 in accordance with the present invention is shown. The faceplate 40 is a pseudo-precision fiber array in which bundles of fibers 44 are located substantially on precise centers determined by the x-y coordinates of the pixels 12 for the sources or detectors. An over-sampled approach is used each specific pixel location on the faceplate in order to allow a greater tolerance for alignment error between the faceplate 40 and the pixels 12 of the sources or detectors. As shown in FIG. 5, preferably the bundles of optic fibers 44 comprise a grouping of seven hexagonal fibers 48. As shown in FIG. 5, although the precise center of the optic fiber bundle 44 does not always correspond with the precise center of the pixels 12, a majority of the pixel area corresponds to the area of the optic fiber bundles. This approach reduces the precision required while the at the same time significantly reduces the number of optic fibers utilized in forming the faceplate 40. This leads to significantly reduced costs because fibers which would be unnecessary as in the prior art faceplate shown in FIG. 1 are now eliminated. Filling material 46 is located between the optic fiber bundles 44. Preferably, the optic fiber bundles are formed in a first draw such that each optic fiber bundle 44 is fused together. These optic fiber bundles 44 are then stacked, preferably utilizing interstitial filling material 46 (which may be comprised of a plurality of interstitial filler rods which become fused during the drawing process) in order to maintain the optic fiber bundles 44 in position. The optic fiber bundles are drawn to the desired size, and then cut and polished in order to form the faceplate 40. The bundles 44 may also be formed by placing the individual fibers 48 in a tube (not shown) prior to drawing to hold the fibers in position, with the tube acting as a holder as well as a filler material.

Figure 6:
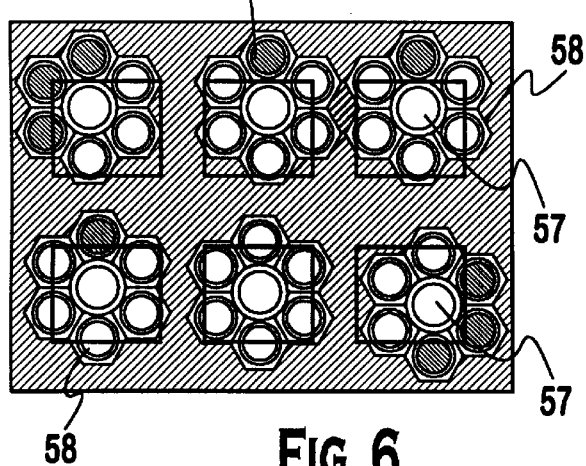
FIG. 6 is a greatly enlarged elevational view of a faceplate in accordance with a fifth preferred embodiment of the present invention.

Referring now to FIG. 6, a fifth preferred embodiment of a faceplate 50 in accordance with the present invention is shown. The faceplate 50 includes a pseudo-precision array similar to the faceplate 40 shown in FIG. 5. However, the optic fiber bundles 54 include a center fiber 57 having a larger open area ratio than the remaining optic fibers 58 in the optic fiber bundle 54. This means that the open area of the final structure is effectively larger than could be normally achieved. The faceplate 50 is formed in a similar manner to the faceplate 40, and accordingly a detailed description has not been provided. However, the larger open area of the central optic fiber 57 of each bundle 40 provides for a greater transmission with less loss than a standard fiber optic faceplate array.

Figure 7:
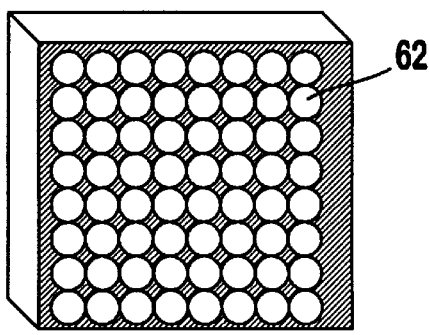
FIG. 7 is a greatly enlarged elevational view of a wave guide faceplate in accordance with a sixth preferred embodiment of the present invention.

Referring now to FIG. 7, a sixth preferred embodiment 60 of a faceplate array is shown. The faceplate array 60 is a wave guide faceplate in which a plurality of wave guides which propagate optic power perpendicular to the surface of the faceplate 60 are provided. The wave guides may be fused silica or multi-component glass. The wave guides 62 are preferably aligned in a similar manner to the optic fibers in the previous embodiments of the invention.

Figure 8:
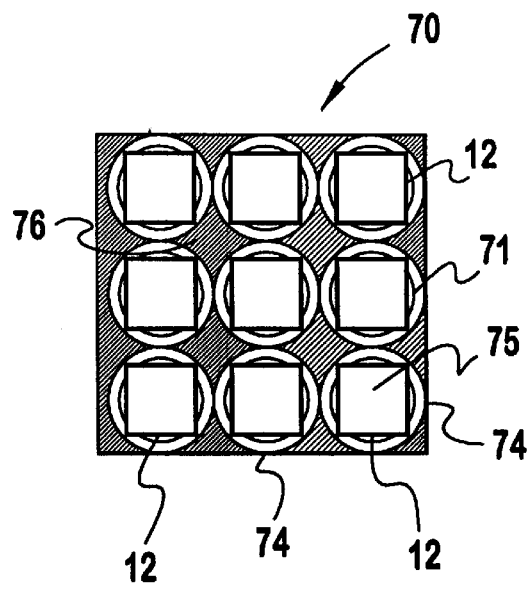
FIG. 8 is a greatly enlarged elevational view of a faceplate having absorbing glass clad cores.

Referring now to FIG. 8, a faceplate 70 in accordance with a seventh preferred embodiment of the invention is shown. The faceplate 70 is similar to the faceplate 10 of the first embodiment of the invention except that an absorbing glass cladding 71 is located around the core 75 of the optic fibers 74. Interstitial fillers 76 are preferably located between the optic fibers 74 in order to maintain the optic fibers in a square pack alignment.

While the preferred embodiments of the invention have been described as square packs, those skilled in the art will recognize that other arrangements can be utilized and that the cross-sectional shape of the optic fibers 14 can be varied. For example, four sided, five sided or six sided optic fibers can be utilized and the optic fiber may be precisely positioned in a square pack arrangement or in an offset stacking arrangement, as desired.

In all of the preferred embodiments, the optic fibers 14, 48 and 58 are preferably drawn under precise control in order to maintain a precise and uniform optic fiber size prior to the fibers being stacked in a pre-form and drawn in order to form the faceplates in accordance with the present invention. This may be accomplished by a drawing equipment having a diameter sensor connected to a feedback control to increase or decrease the drawing speed in order to maintain a precise size for the optic fiber. These optic fibers are then utilized to form the faceplate stackup, or in an interim step to form optic fiber bundles having a precise size and alignment of optic fibers, such as in the fourth and fifth embodiments 40 and 50 of the present invention.

Through the use of precision arrays and pseudo-precision arrays, manufacturing costs are substantially decreased due to the usage of a smaller number of optic fibers or wave guides. Additionally, the faceplates allow for reduced power since less energy is lost to heat in the cladding surrounding each fiber. While interstitial fillers are shown in the preferred embodiments, the fillers may be omitted, depending upon the arrangement being utilized. However, for a square pack design, interstitial fillers drawn in a precise manner ensure precise alignment of the optic fibers with the desired x-y coordinates can be maintained.

While the preferred embodiments of the invention have been described in detail, the invention is not limited to the specific embodiments described above, which should be considered as merely exemplary. Further modifications and extensions of the present invention may be developed, and all such modifications are deemed to be within the scope of the present invention as defined by the appending claims.

What is claimed is:

1. A fiber optic faceplate for coupling with optical sources or detectors, the optical sources or detectors being arranged in a two-dimensional array, each of the sources or detectors having a pixel area precisely located at a predetermined x-y coordinate spaced at an equal distance from neighboring pixel areas, the faceplate comprising:

a plurality of drawn and fused optic fibers and interstitial fillers, each of the optic fibers being positioned at a corresponding position to the pixel areas of the optical sources or detectors, the optic fibers being drawn to an outside diameter corresponding to the spacing distance between the predetermined x-y coordinates, the interstitial fillers being located at each interstitial space between the optic fibers and having an outside diameter corresponding to the space between the optic fibers to maintain the optic fibers in an aligned position as they are drawn.

2. The fiber optic faceplate of claim 1 wherein the optic fibers and the interstitial fillers have approximately the same viscosity at drawing temperature.

3. The fiber optic faceplate of claim 1 wherein the optic fibers are arranged in a square pack, and one of the interstitial fillers is located in the interstitial space between each group of four neighboring optic fibers.

4. The fiber optic faceplate of claim 1 wherein the outside diameter of the optic fiber corresponds to the pixel area.

5. The fiber optic faceplate of claim 1 wherein the optic fibers are GRIN fibers.

6. The fiber optic faceplate of claim 1 wherein the optic fibers are single mode fibers.

7. The fiber optic faceplate of claim 1 wherein the interstitial fillers are made of a light absorbing material.

8. A fiber optic faceplate for coupling with optical sources or detectors, the optical sources or detectors being arranged in a two-dimensional array, each individual source or detector being precisely located at a predetermined position spaced apart from neighboring sources or detectors, the faceplate comprising:

a plurality of drawn and fused optic fiber bundles, each optic fiber bundle including a plurality of optic fibers and having a greater cross-sectional area than an area of a pixel of the source or detector, each optic fiber bundle being located in a generally aligned position with a corresponding pixel of the source or detector such that the pixel is aligned with at least half of the active area of the corresponding bundle, and a filler material located between adjacent fiber bundles to maintain the fiber bundles in position as they are drawn and fused.

9. The fiber optic faceplate of claim 8 wherein the optic fiber bundles include a generally centrally located optic fiber having a larger open area ratio than at least some of the other fibers in the bundles.

10. The fiber optic faceplate of claim 8 wherein the interstitial fillers are formed of a light absorbing glass.

11. The fiber optic faceplate of claim 8, wherein the optic fibers and the interstitial fillers have approximately the same viscosity at drawing temperature.

12. The fiber optic faceplate of claim 8 wherein the optic fibers are GRIN fibers.

13. The fiber optic faceplate of claim 8 wherein the optic fibers are single mode fibers.

* * * * *